United States Patent
Marion et al.

(10) Patent No.: US 7,248,267 B2
(45) Date of Patent: Jul. 24, 2007

(54) METHOD AND APPARATUS FOR SIMULATED DIRECT FRAME BUFFER ACCESS FOR GRAPHICS ADAPTERS

(75) Inventors: Neal Richard Marion, Georgetown, TX (US); Shawn Patrick Mullen, Buda, TX (US); George F. Ramsay, II, Cedar Park, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 10/394,325

(22) Filed: Mar. 20, 2003

(65) Prior Publication Data
US 2004/0183806 A1 Sep. 23, 2004

(51) Int. Cl.
*G06F 15/167* (2006.01)
*G06T 1/60* (2006.01)

(52) U.S. Cl. ............... 345/542; 345/541; 345/530
(58) Field of Classification Search ........... 345/542, 345/541, 538, 543, 545, 530; 710/308; 711/171
See application file for complete search history.

(56) References Cited

U.S. PATENT DOCUMENTS

| | | | | |
|---|---|---|---|---|
| 4,633,312 A | 12/1986 | Yasuda | ............... | 358/136 |
| 4,868,557 A | 9/1989 | Perlman | ............... | 340/799 |
| 5,477,242 A | 12/1995 | Thompson et al. | ......... | 345/132 |
| 5,512,918 A * | 4/1996 | Forrest et al. | ............... | 345/473 |
| 5,638,531 A | 6/1997 | Crump et al. | ............... | 395/450 |
| 5,790,138 A * | 8/1998 | Hsu | ............... | 345/542 |
| 5,793,385 A * | 8/1998 | Nale | ............... | 345/542 |
| 5,832,246 A * | 11/1998 | Matsumoto | ............... | 710/308 |
| 5,900,885 A * | 5/1999 | Stortz | ............... | 345/537 |
| 5,978,893 A * | 11/1999 | Bakshi et al. | ............... | 711/171 |
| 6,209,063 B1 * | 3/2001 | Kempf | ............... | 711/135 |
| 6,222,564 B1 * | 4/2001 | Sturges | ............... | 345/531 |
| 6,223,239 B1 | 4/2001 | Olarig | ............... | 710/129 |

OTHER PUBLICATIONS

Parlante, N. 2000. Pointers and Memory. CS Education Library Documents. p. 3, 10. http://cslibrary.stanford.edu/102/PointersAndMemory.pdf.*
Riemersma, T. Aug. 1, 2001. Detecting Vertical Retrace in Microsoft Windows. ITB CompuPhase. http://www.compuphase.com/vretrace.htm.*
Kozierok, C. Apr. 17, 2001. Interrupt Function and Operation. The PC Guide. http://www.pcguide.com/ref/mbsys/res/irq/func.htm.*

(Continued)

*Primary Examiner*—Ulka Chauhan
*Assistant Examiner*—Joni Hsu
(74) *Attorney, Agent, or Firm*—Duke W. Yee; Libby Z. Handelsman; Theodore D. Fay, III

(57) ABSTRACT

A method, data processing system, and computer instructions for simulating direct frame buffer access. A request for access to a frame buffer memory is received from an application. A portion of system memory is allocated for use as the frame buffer memory in response to receiving the request. A pointer to the portion of system memory is returned to the application. The application writes data to the portion of system memory, treating the portion of system memory like the frame buffer memory.

16 Claims, 3 Drawing Sheets

OTHER PUBLICATIONS

Parlante, N. 2000. "Pointers and Memory." CS Education Library Documents. p. 3, 10. http://cslibrary.stanford.edu/102/PointersAndMemory.pdf.*

Riemersma, T. Aug. 1, 2001. "Detecting Vertical Retrace in Microsoft Windows." ITB CompuPhase. http://www.compuphase.com/vretrace.htm.*

Kozierok, C. Apr. 17, 2001. "Interrupt Function and Operation." The PC Guide. http://www.pcguide.com/ref/mbsys/res/irq/func.htm.*

IBM Technical Disclosure Bulletin, "PC BIOS Performance Enhancements for Non-PC Supported Display Adapters", vol. 29, No. 6, Nov. 1986, pp. 2695-2696.

Research Disclosure 28507, "Improved Professional Graphics Controller", Kenneth Mason Publications Ltd., England, Jan. 1988, No. 285.

Research Disclosure 28539, "Adaptive Emulation Optimizing Circuit", Kenneth Mason Publications Ltd., England, Jan. 1988, No. 285.

* cited by examiner

METHOD AND APPARATUS FOR SIMULATED DIRECT FRAME BUFFER ACCESS FOR GRAPHICS ADAPTERS

BACKGROUND OF THE INVENTION

1. Technical Field

The present invention provides an improved data processing system and in particular a method and apparatus for processing graphics data. Still more particularly, the present invention provides a method and apparatus for simulating direct frame buffer access in a data processing system.

2. Description of Related Art

Computer graphics concerns the synthesis or display of real or imaginary objects from computer-based models. In computer graphics systems, images are displayed on a display device to a user in two dimensional and three dimensional forms. These images are displayed using pixels. A pixel is short for a picture element. One spot in a rectilinear grid of thousands of such spots that are individually "painted" to form an image produced on the screen by a computer or on paper by a printer. A pixel is the smallest element that display or print hardware and software can manipulate in creating letters, numbers, or graphics. These pixels and information relating to these pixels are stored in a buffer.

One buffer in which this information may be stored is a frame buffer, which is an area of memory used to hold a frame of data. A frame buffer is typically used for screen display and is the size of the maximum image area on screen. This memory is a separate memory bank on a display adapter that holds a bitmapped image while the image is being "painted" or presented on screen.

One feature available on many graphics cards is direct frame buffer access (DFA). Typically, an application will request an area in the frame buffer memory, which may be on-screen or off-screen. In response, a pointer is returned to the application for the memory area. The application may then perform direct reads and writes to this memory area. This process allows the application to directly access the frame buffer memory on the graphics adapter. Such a feature is a prevalent function and mechanism provided on many graphics cards.

In some cases, this DFA function may be unavailable or unsupported. In these instances, an application designed to use DFA may be unable to function properly on the data processing system in which this function is not found. Therefore, it would be advantageous to have an improved method and apparatus for supporting DFA in a data processing system.

SUMMARY OF THE INVENTION

The present invention provides a method, data processing system, and computer instructions for simulating direct frame buffer access. A request for access to a frame buffer memory is received from an application. A portion of system memory is allocated for use as the frame buffer memory in response to receiving the request. A pointer to the portion of system memory is returned to the application. The application writes data to the portion of system memory, treating the portion of system memory like the frame buffer memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
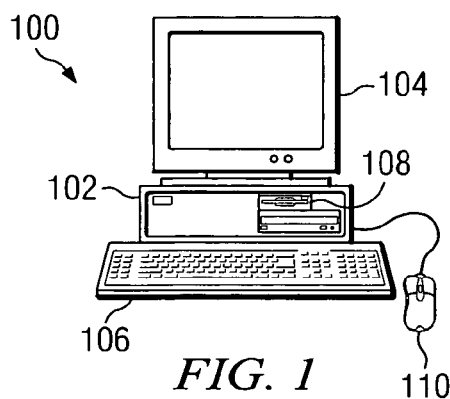
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
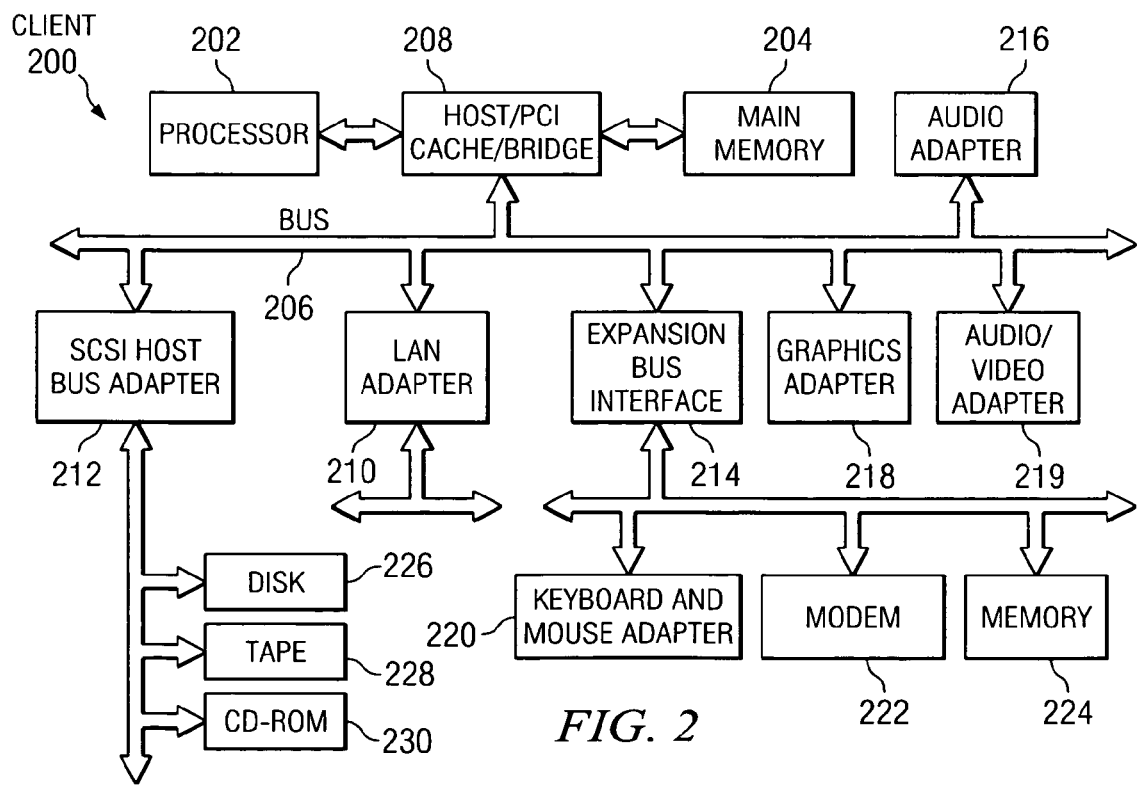
FIG. 2 is a block diagram of a data processing system shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
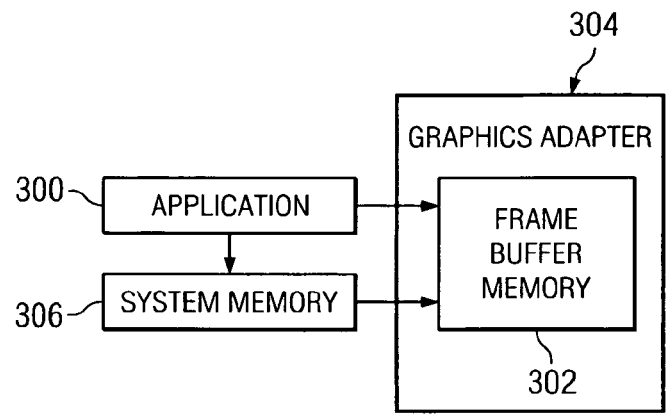
FIG. 3 is a diagram of memory components used in providing a software simulation of direct frame buffer access for graphics adapters without direct frame buffer access support in hardware depicted in accordance with a preferred embodiment of the present invention.

Turning next to FIG. 3, a diagram of memory components used in providing a software simulation of direct frame buffer access for graphics adapters without direct frame buffer access support in hardware is depicted in accordance with a preferred embodiment of the present invention. The present invention provides a software mechanism for direct frame buffer access when a graphics adapter does not support this type of function.

In this example, application 300 request for an area of frame buffer memory 302 on graphics adapter 304. Graphics adapter 304 may be implemented as graphics adapter 218 in FIG. 2. Normally, in response to this request, a pointer to this memory area is returned. When this function is not available, the mechanism of the present invention returns a pointer to a portion of system memory 306. In these examples, system memory is the memory used by the operating system, such as, for example, memory 204 and memory 224 in FIG. 2.

Application 300 performs, reads and writes to system memory 306 thinking that this memory is actually a portion of frame buffer memory 302. In this manner, application 300 believes that it is performing direct frames buffer access (DFA) writes.

During a selected period of time, data written by application 300 into system memory 306 is sent to frame buffer memory 302. This period of time is selected as being the period of time during which the vertical retrace occurs for a monitor. A monitor is updated scan-line to scan-line from the top to the bottom of the screen. Data written to frame buffer memory 302 does not appear until the scan-line on which the pixel was located has been scanned by the electron gun in a monitor. In other words, a lag occurs between a DFA write and when the monitor shows a pixel change. Updates to on screen memory within frame buffer memory 302 are performed during the time in which the electron gun is in a vertical retrace mode, moving to the bottom right of the display back to the top left of the display, without the user noticing any glitches or tearing on the screen. Thus, data located in system memory 306 is written to frame buffer memory 302 during the vertical retrace period of the monitor in accordance with a preferred embodiment of the present invention.

Figure 4:
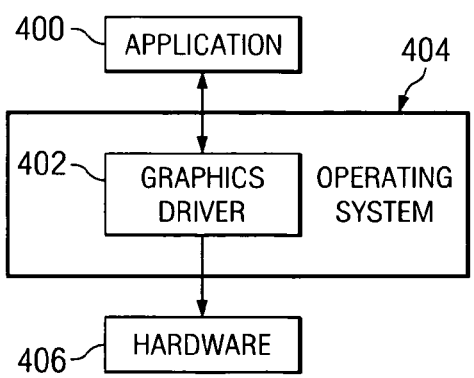
FIG. 4 is a block diagram illustrating components used to provide software simulation of direct frame buffer access depicted in accordance with a preferred embodiment of the present invention.

With reference next to FIG. 4, a block diagram illustrating components used to provide software simulation of direct frame buffer access is depicted in accordance with a preferred embodiment of the present invention. In this example, application 400 sends a request for access to a buffer memory to graphics driver 402 in operating system 404. Graphics driver 402 provides interface to hardware 406. In this example, hardware 406 includes main memory 204, main memory 224, frame buffer memory 302. Graphics driver 402 allocates a portion of system memory in response to receiving the request. A pointer to this memory is returned to application 400, which performs reads and writes to the system memory.

Further, graphic driver 402 also copies the contents of system memory to the frame buffer memory. This copy process is performed during a vertical retrace period of the monitor.

Figure 5:
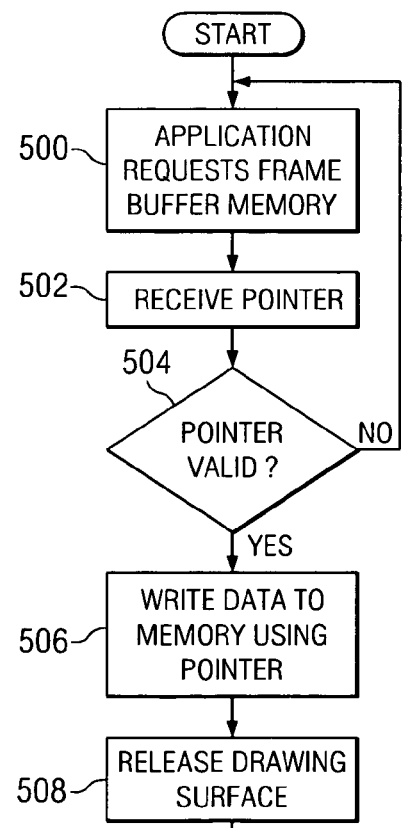
FIG. 5 is a flowchart of a process for performing a direct frame buffer access depicted in accordance with a preferred embodiment of the present invention.

Turning next to FIG. 5, a flowchart of a process for performing a direct frame buffer access is depicted in accordance with a preferred embodiment of the present invention. The process illustrated in FIG. 5 may be implemented in an application, such as application 300 in FIG. 3.

The process begins by the application generating a request for frame buffer memory (step 500). In this example, the application includes a width and height used to define the size of the memory needed by the application. The application then receives a pointer (step 502). A determination is then made as to whether the pointer is valid (step 504). In this example, a pointer is valid unless the pointer has a null value. If the pointer is valid, data is written to the memory using the pointer (step 506). This pointer is a pointer to system memory. The application, however, believes that the pointer is to a portion of the frame buffer memory. Thereafter, the drawing surface is released when the application is finished reading and writing to the memory (step 508) with the process terminating thereafter. In step 508, the releasing of the drawing surface is performed to inform the device driver that the application is finished using that particular area of the frame buffer memory. This step also is performed to release the memory such that the device driver may make this memory available for reuse.

Turning back to step 504, if the pointer is not valid, the process returns to step 500. In returning to step 500, another request is made for frame buffer memory. In this request, however, the size of the memory is changed, usually to a smaller size.

Figure 6:
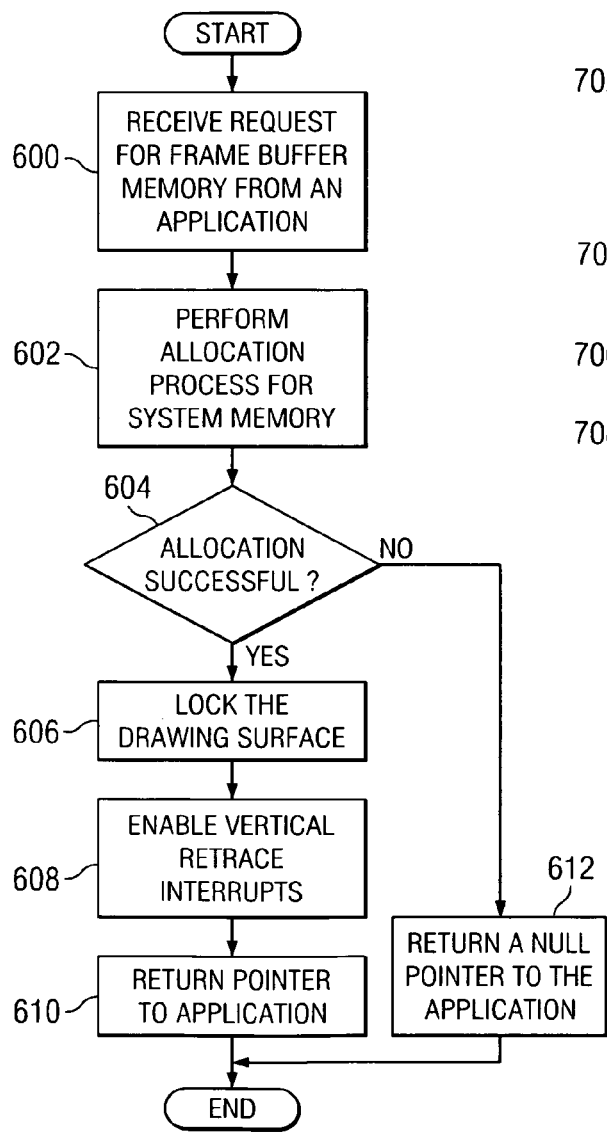
FIG. 6 is the flowchart of a process for allocating memory depicted in accordance with a preferred embodiment of the present invention.

Turning now to FIG. 6, the flowchart of a process for allocating memory is depicted in accordance with a preferred embodiment of the present invention. The process illustrated in FIG. 6, may be implemented in a software component in an operating system, such as graphics driver 402 in FIG. 4.

The process begins by receiving a request for frame buffer memory from an application (step 600). This request typically includes a memory size that is desired by the application. The memory size may be defined using parameters, such as a width and height. An allocation process is performed to allocate system memory using the request (step 602). A determination is then made as to whether the allocation of the memory was successful (step 604).

If the allocation of system memory was successful, the drawing surface was locked (step 606). By locking the drawing surface, the device driver provides exclusive access to the application for that area of memory. In these examples, the feature applies to the frame buffer memory to prevent multiple applications from accessing the memory in attempting to write directly to the screen. In writing directly to the screen, each application locks the area of memory before writing data to that area of the memory. Next, vertical retrace interrupts are enabled (step 608). These interrupts are used to identify when data may be copied from the system memory, allocated in response to the request, to the frame buffer memory. An interrupt is received or detected when the vertical retrace period begins. During this period of time, data may be copied from the system memory to the frame buffer memory without causing tears or glitches to the display. Thereafter, a pointer to the system memory is returned to the application (step 610) with the process terminating thereafter.

With reference again to step 604, if the allocation of the memory was not successful, a null pointer is returned to the application (step 612) with the process terminating thereafter.

Figure 7:
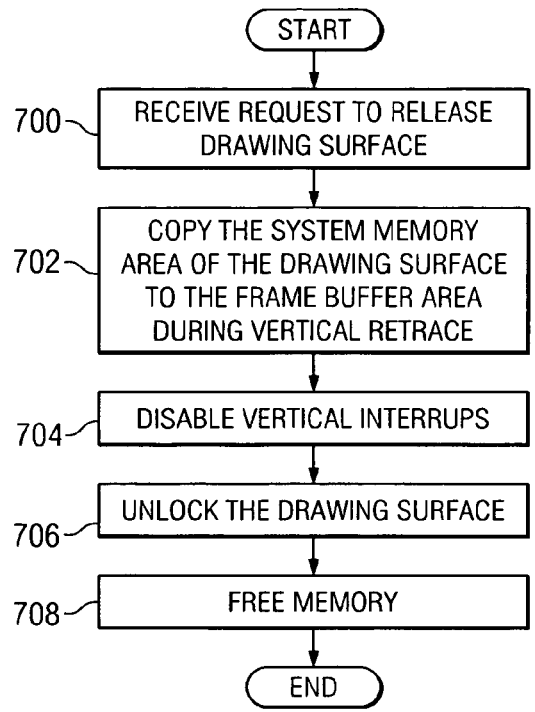
FIG. 7 is a flowchart of a process for freeing memory depicted in accordance with a preferred embodiment of the present invention.

With reference next to FIG. 7, a flowchart of a process for freeing memory is depicted in accordance with a preferred embodiment of the present invention. The process illustrated in FIG. 7 may be implemented in a software component in the operating system, such as graphics driver 402 in FIG. 4.

The process begins by receiving a request to release the drawing surface (step 700). This request is received from the application. An application releases or frees a drawing surface before the application ends execution. Such a request may be made by an application when the application is finished with a screen of information that is being displayed. For example, if a user playing a game requests to see information about a score, the application may request an area of frame buffer memory, draw the score information to that area, copy that information in that area to the visible area of the frame buffer, let the user respond, then when the user is finished, the application releases the original area of the frame buffer memory. These operations may occur hundreds of times in a game as the user traverses screens.

Then, the system memory area of the drawing surface is copied to the off-screen frame buffer area in the frame buffer memory during vertical retrace (step 702). Step 702 and 704 are performed to insure that the last screen of data is copied for the application. The application writes data to the system memory area believing that this data is being written directly to the frame buffer. The application is unaware of the vertical interrupts upon which the device driver is relying upon to copy the system memory area to the frame buffer. After the application finishes writing data, the application immediately releases the memory exacting that the data has already been displayed on the screen or is located in some other area on the frame buffer. However, depending on the timing of the vertical retrace, the writes made by the application may be only reflected in the system memory and not in the frame buffer. At this point, the device driver ensures that one last copy of data from the system memory to the frame buffer is performed. This copy is made to ensure that the last drawing performed by the application is reflected in the frame buffer and not just in the system memory.

Next, the vertical interrupts are disabled (step 704). The vertical interrupts are disabled because data no longer needs to be copied from the system memory to the frame buffer memory. The drawing surface is then unlocked (step 706). The system memory is freed (step 708), with the process terminating thereafter.

Figure 8:
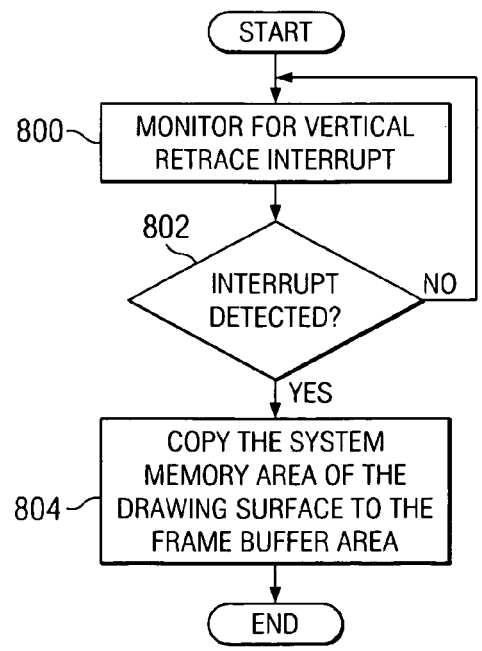
FIG. 8 is a flowchart of a process for updating a display depicted in accordance with a preferred embodiment of the present invention.

With reference next to FIG. 8, a flowchart of a process for updating a display is depicted in accordance with a preferred embodiment of the present invention. The process illustrated in FIG. 8 may be implemented in a software component, such as graphics driver 402 in FIG. 4.

The process begins by monitoring for a vertical retrace interrupt (step 800). A determination is made as to whether a vertical retrace interrupt has been detected (step 802). If a vertical retrace interrupt has been detected, the system memory area of the drawing surface is copied to the frame buffer area (step 804), with the process terminating thereafter. Otherwise, the process returns to step 800.

Thus, the present invention provides an improved method, apparatus, and computer instructions for providing a direct frame buffer access function to applications in data processing systems in which this function is unsupported in the hardware. The mechanism of the present invention simulates a direct frame buffer access function using a memory other than that of the frame buffer. In these examples, system memory is allocated. A pointer to this allocated memory is returned to the application. The application reads and writes to this memory, using the pointer, as if the memory were in the frame buffer. The mechanism of the present invention copies data from the allocated memory from the direct frame buffer to display the data. The copying or moving of data is performed during a period of time in which data may be written to the frame buffer without causing glitches or tears that may be noticed by the user. In these examples, the period of time is during the vertical retrace.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for simulating direct frame buffer access, the method comprising:
   receiving a request for access to a frame buffer memory located in a graphics adapter from an application, wherein direct frame buffer access is unsupported by the graphics adapter;
   responsive to receiving the request, allocating a portion of system memory for use as the frame buffer memory to form an allocated portion of system memory, wherein the allocated portion of system memory is used in conjunction with existing frame buffer memory located in the graphics adapter, and wherein the system memory is used by an operating system of the data processing system;
   returning a pointer to the allocated portion of system memory to the application, wherein the application writes data to the allocated portion of system memory, treating the allocated portion of system memory like the frame buffer memory; and
   sending data in the allocated portion of system memory to a screen memory on the graphics adapter and displaying the data during a selected period of time.

2. The method of claim 1, wherein the selected period of time is a vertical retrace period of a monitor.

3. The method of claim 1, wherein the request includes a memory size.

4. The method of claim 1, wherein the sending step is facilitated using an interrupt, wherein the interrupt indicates that the selected period of time has begun.

5. The method of claim 1, wherein sending step is initiated by the application releasing a drawing surface associated with the allocated portion of system memory.

6. A data processing system for simulating direct frame buffer access, the data processing system comprising:
   receiving means for receiving a request for access to a frame buffer memory located in a graphics adapter from an application, wherein direct frame buffer access is unsupported by the graphics adapter;
   allocating means, responsive to receiving the request, for allocating a portion of system memory for use as the frame buffer memory to the application to form an allocated portion of system memory, wherein the allocated portion of system memory is used in conjunction with existing frame buffer memory located in the graphics adapter, and wherein the system memory is used by an operating system of the data processing system;
   returning means for returning a pointer to the allocated portion of system memory, wherein the application writes data to the allocated portion of system memory, treating the allocated portion of system memory like the frame buffer memory; and
   sending means for sending data in the allocated portion of system memory to a screen memory on the graphics adapter for display during a selected period of time.

7. The data processing system of claim 6, wherein the selected period of time is a vertical retrace period of a monitor.

8. The data processing system of claim 6, wherein the request includes a memory size.

9. The data processing system of claim 6, wherein the sending means involves using an interrupt, wherein the interrupt indicates that the selected period of time has begun.

10. The data processing system of claim 6, wherein sending means is initiated by the application releasing a drawing surface associated with the allocated portion of system memory.

11. A data processing system in a data for simulating direct frame buffer access, the data processing system comprising:
    a bus system;
    a memory connected to the bus system, wherein the memory includes a set of instructions; and a processing unit connected to the bus system, wherein the processing unit executes the set of instructions to receive a request for access to a frame buffer memory located in a graphic adapter from an application, wherein direct frame buffer access is unsupported by the graphics adapter; allocate a portion of system memory for use as the frame buffer memory in response to receiving the request to form an allocated portion of system memory, wherein the allocated portion of system memory is used in conjunction with existing frame buffer memory located in the graphics adapter; return a pointer to the allocated portion of system memory to the application, wherein the application writes data to the allocated portion of system memory, treating the allocated portion of system memory like the frame buffer memory, and wherein the system memory is used by an operating system of the data processing system; and send data in the allocated portion of system memory to a screen memory on the graphics adapter for display during a selected period of time.

12. A recordable-type computer readable medium encoded with computer executable instructions for simulating direct frame buffer access, the computer executable instructions comprising:
    first instructions for receiving a request for access to a frame buffer memory located in a graphic adapter from an application, wherein direct frame buffer access is unsupported by the graphics adapter;
    second instructions, responsive to receiving the request, for allocating a portion of system memory for use as the frame buffer memory to form an allocated portion of system memory, wherein the allocated portion of system memory is used in conjunction with existing frame buffer memory located in the graphics adapter, and wherein the system memory is used by an operating system of the data processing system;
    third instructions for returning a pointer to the allocated portion of system memory to the application, wherein the application writes data to the allocated portion of system memory, treating the allocated portion of system memory like the frame buffer memory; and
    fourth instructions for sending data in the allocated portion of system memory to a screen memory on the graphics adapter and displaying the data during a selected period of time.

13. The recordable-type computer readable medium of claim 12, wherein the selected period of time is a vertical retrace period of a monitor.

14. The recordable-type computer readable medium of claim 12, wherein the request includes a memory size.

15. The recordable-type computer readable medium of claim 12, wherein the sending step is facilitated using an interrupt, wherein the interrupt indicates that the selected period of time has begun.

16. The recordable-type computer readable medium of claim 12, wherein sending step is initiated by the application releasing a drawing surface associated with the allocated portion of system memory.

\* \* \* \* \*